United States Patent
Hsu et al.

(10) Patent No.: US 6,349,078 B1
(45) Date of Patent: Feb. 19, 2002

(54) TRACK-NUMBER SEEKING ALGORITHM AND SEEKING MEANS FOR DYNAMIC MODIFICATION OF TRACK NUMBERS COMPUTING IN AN OPTICAL STORAGE DEVICE

(75) Inventors: Jen-Yu Hsu, Taipei Hsien; Chien-Li Hung, Chiayi Hsien; Chieh-Chih Li, Chiayi; Carl Yang, Hsinchu, all of (TW)

(73) Assignee: Inductrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/474,994

(22) Filed: Dec. 30, 1999

(30) Foreign Application Priority Data

Aug. 9, 1999 (TW) .......................................... 88113560

(51) Int. Cl.[7] .............................................. G11B 17/22
(52) U.S. Cl. ...................................... 369/32; 369/44.28
(58) Field of Search ....................... 369/32, 33, 44.28, 369/44.27, 44.29; 300/77.02, 78.04

(56) References Cited

U.S. PATENT DOCUMENTS

| | | | | |
|---|---|---|---|---|
| 4,562,562 A | * | 12/1985 | Moriya et al. ............... | 369/32 |
| 4,630,250 A | * | 12/1986 | Nonomura ..................... | 369/32 |
| 4,644,514 A | * | 2/1987 | Ohshima et al. ............. | 369/32 |
| 4,866,687 A | * | 9/1989 | Kasai et al .................. | 369/32 |
| 5,285,431 A | * | 2/1994 | Ogawa .......................... | 369/32 |
| 5,398,221 A | * | 3/1995 | Ogawa .......................... | 369/32 |
| 5,459,705 A | * | 10/1995 | Matoba et al. ............. | 369/44.34 |
| 6,167,011 A | * | 12/2000 | Sun et al. .................. | 369/44.41 |

* cited by examiner

Primary Examiner—Tan Dinh
(74) Attorney, Agent, or Firm—J. C. Patents (57) ABSTRACT

A track-number seeking algorithm and a seeking means for the dynamic modification of the computation of track numbers in an optical storage device employs a down counter, an up counter and a microprocessor. First, a rotation number of an optical storage disk in the microprocessor, a track error zero crossing signal of the down counter and the up counter are reset, a static track seeking number of the down counter is set, and a seeking operation is performed. The seeking operation reads the rotation number and the track error zero crossing signal, computes a residual track number, and judges whether an overflow flag is to be sent. If the overflow flag is sent, then, the rotation number is added, a pulse number of a feedback signal is reset, and the next step is to judge whether the seeking operation is outward or not. If the overflow flag is not sent, the next step is to judge directly whether the seeking operation is outward or not. Next, if the seeking operation is outward, and the residual track number is equal to the rotation number, the seeking operation is terminated; otherwise, the seeking operation is repeated. If the seeking operation is inward, and the residual track number is equal to the negative value of the rotation number, the seeking operation is terminated; otherwise, the seeking operation is repeated.

6 Claims, 7 Drawing Sheets

TRACK-NUMBER SEEKING ALGORITHM AND SEEKING MEANS FOR DYNAMIC MODIFICATION OF TRACK NUMBERS COMPUTING IN AN OPTICAL STORAGE DEVICE

CROSS-REFERENCE TO RELATED APPLICATION

This application claims the priority benefit of Taiwan application serial no. 88113560, filed Aug. 9, 1999.

BACKGROUND OF THE INVENTION

1. Field of the Invention

The invention relates to a track-number seeking algorithm and a seeking means for an optical storage device, and more particularly, to a track-number seeking algorithm and a seeking means for the dynamic modification of the computation of track numbers in an optical storage device.

2. Description of the Related Art

Tracks in AN optical storage disk are arranged in a spiral fashion. That is, the tracks consist of a continuous spiral track starting from the center of the optical storage disk such that the track appears as a flat coil on the optical storage disk.

Figure 1:
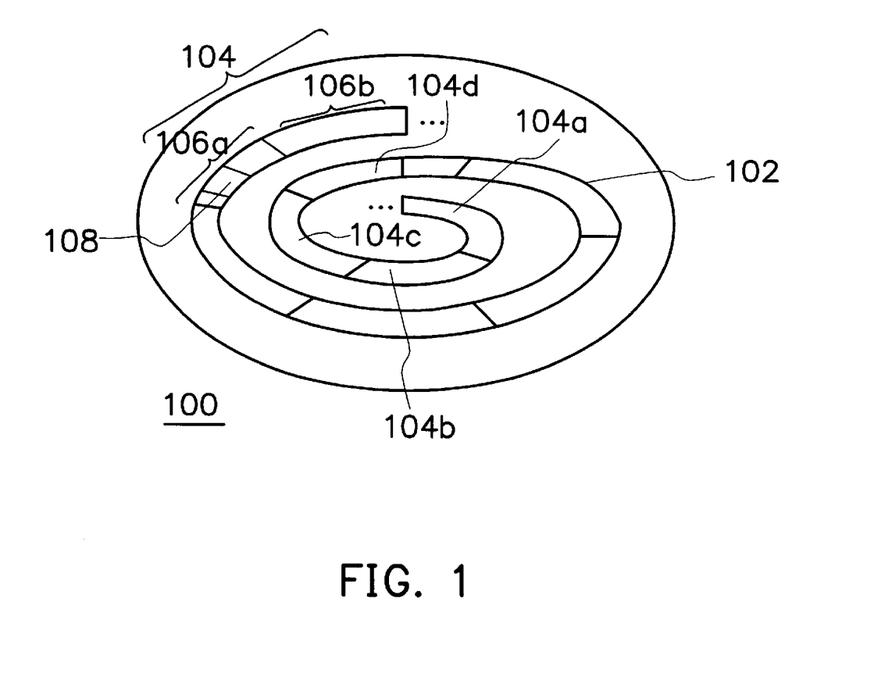
FIG. 1 is a schematic diagram of tracks in an optical storage disk.

A frame and a sector are defined as storage units in the storage structure of the optical storage disk. with consideration for the data storage, the control, the error detection, and the error correction of the optical storage disk. FIG. 1 is a schematic diagram of tracks on an optical storage disk. The tracks consist of frames 104 in the disk 100. Each of the frames 104 is further divided into a subcode region 106a and a data region 106b. The subcode region 106a consists of a Q code and a sector ID 108 for describing properties of the stored data in the frame 104 and the location thereof in the disk 100. A coiled track 102 consists of a plurality of frames cycling around the center of the optical storage disk 100. For example, a coiled track consists of frames 104a, 104b, 104c, and 104d as shown in FIG. 1. Generally, data reading is performed at a constant linear velocity or a constant angular velocity. The spiral circumference of a coiled track close to the center of the optical storage disk is shorter than that close to the edge thereof, i.e. the length of a coiled track close to the center of the optical storage disk is shorter than that close to the edge thereof, and the capacity of a coiled track close to the center of the optical storage disk is smaller than that close to the edge thereof. Thus, when reading at the constant angular velocity, the revolution speed of the motor in a compact disk driver in an interior coil is slower than that in an outer coil.

While randomly accessing the optical storage disk, a pickup head is moved to a desired track along radical direction. This action is called seeking. While reading a particular track in a particular frame, the pickup head is moved along the tangential direction of the coiled track. This action is called track following.

Generally, since the spacing between two adjacent tracks is a constant, for example, the spacing is 1.6 $\mu$m in a compact disk (CD), and the spacing is 0.74 $\mu$m in a digital versatile disk (DVD), thus, the distance between two arbitrary tracks can be computed through the Q code and the sector ID. According to the relative track number computed from the Q code and the sector ID, the system can give a reference for performing a seeking operation. However, because of a number of reasons such as the relative track number cannot be precisely computed, a seeking operation may cause a deviation, the disk has scratches and defects, the data density during recording depends upon the amount of data, or the data recorded in different disks correspond to different constant linear velocities, the seeking operation may be repeated. Thus, the access time of the compact disk driver is increased, and the performance thereof is affected.

In order to solve the above problems, U.S. Pat. No. 5,195,068 provides a method using a plurality of linear equations to approach a function of absolute time in the Q code (or the sector ID) and absolute track number of the data region. In the seeking operation, the system generates a track crossing number for computing, using the parameters obtained from the linear equations and stored in a memory. However, since the method uses linear equations to approximate a nonlinear function, the track crossing number generated by the system has a greater deviation in some sectors. Thus, the application of the method is restricted.

T.W.P. 081366 provides a more precise method to generate a relative track seeking number and to perform a calibration at different constant linear velocities. According to the method, a nonlinear geometrical relationship between a disk and tracks is used to establish a data table for a reference disk. When the disk is placed in a compact disk driver and the compact disk driver is activated, a calibration process of the disk is performed to generate a constant-linear-velocity index and a time-correction parameter. Using the data table, the constant-linear-velocity index and the time-correction parameter, a relative track seeking number is obtained.

The constant-linear-velocity interior revolution speed of a 1×speed CD-ROM (compact disk read only memory) is 8 Hz, i.e. 8 revolutions per second (rps). In the case of a 50×speed CD-ROM, the motor revolution speed is equivalent to 20 times the constant-linear-velocity interior revolution speed of a 1×speed CD-ROM, i.e. 160 Hz, or 6.25 milliseconds (ms) per revolution. In the average servo system, the seeking process for 200 tracks requires 25 ms. In other words, for the 50×speed CD-ROM, in the 25 ms, the motor has rotated 4 revolutions.

The constant-linear-velocity interior revolution speed of a 1×speed DVD-ROM (digital versatile disk read only memory) is 23.1 Hz, i.e. 23.1 rps. In the case of a 20×speed DVD-ROM, the motor revolution speed is equivalent to 8 times the constant-linear-velocity interior revolution speed of a 1×speed DVD-ROM, i.e., 160 Hz, or 6.25 ms per revolution. In the average servo system, the seeking process for 200 tracks requires 25 ms. In other words. for the 20×speed DVD-ROM, in the 25 ms, the motor has rotated 4 revolutions.

According to the above, a deviation of 4 revolutions can be generated when the seeking process starts from the interior tracks to the outer tracks, or from the outer tracks to the interior tracks.

According to the above two methods, the well-known computation of the track seeking number only applies to the case when the pickup head has no relative motion to the disk. However, when the pickup head starts the seeking operation, the disk has a revolution speed, i.e. there is a relative motion. Thus, a deviation of the track crossing number is generated, and the seeking operation is repeated. As a result, the access speed of the compact disk driver becomes slower, and the access time is increased. That is, in the seeking operation, the relative motion between the pickup head and the disk can cause the computing error of the relative track seeking number.

SUMMARY OF THE INVENTION

According to the above, the invention provides a track-number seeking algorithm and a seeking means for the dynamic modification of the computation of track numbers in an optical storage device to correct the deviation generated from the motions of the pickup head and the optical storage disk and further to move the pickup head to a target track. Thus, the invention can reduce the average number of track skipping, raise the access speed of the optical storage device and enhance the performance of the optical storage device.

The invention provides a track-number seeking algorithm for the dynamic modification of the computation of track numbers in an optical storage device. The seeking algorithm comprises resetting a rotation number of the disk and a track error zero crossing (TEZC) signal, setting a static relative track seeking number, and performing a seeking operation. The seeking operation comprises reading the rotation number of the disk and a TEZC signal series, computing a residual track number in accordance with the rotation number of the disk and the TEZC signal, and judging whether an overflow flag is sent or not in accordance with a pulse number of a feedback flag. If the overflow flag is sent, the subsequent steps are to increase the rotation number of the disk, to reset the pulse number of the feedback signal, and to judge whether the seeking operation is outward or not. If the overflow flag is not sent, the sequential step is directly to judge whether the seeking operation is outward or not. Then, if the seeking operation is outward and the residual track number is equal to the rotation number of the disk, the seeking operation is concluded; otherwise, the seeking operation is repeated. If the seeking operation is inward and the residual track number is equal to the negative value of the rotation number of the disk, the seeking operation is concluded; otherwise, the seeking operation is repeated.

The invention provides a seeking means for the dynamic modification of the computation of track numbers in an optical storage device to execute the track-number seeking algorithm. The means comprises a down counter, an up counter, a microprocessor etc. The down counter is coupled with the pickup head and the microprocessor while the down counter can receive the static relative track seeking number, enabling signal, and TEZC signal in order to compute the residual track number. The up counter is coupled with a spindle motor and the microprocessor while the up counter can receive the feedback signal of the spindle motor in order to compute the rotation number of the disk and to generate the overflow flag. The microprocessor is coupled with the down counter and the up counter. The microprocessor controls the down counter and the up counter using the enabling signal, sets the up counter by means of a resetting signal, resets the pulse number of the TEZC signal to zero, decides by means of comparing the overflow flag with the residual track number whether the pickup head moves to the target track, and drives the pickup head to the desired position by means of controlling a power driver.

It is to be understood that both the foregoing general description and the following detailed description are exemplary, and are intended to provide further explanation of the invention as claimed.

DESCRIPTION OF THE PREFERRED EMBODIMENTS

The seeking means of an optical storage device computes the number of tracks that the pickup head of the seeking means has crossed by means of a track error zero crossing (TEZC) signal or a tracking error signal (TES) detected by the pickup head. In the case of CD-ROM, the tracking error detection is the three-light-beam detection while, in the case of DVD-ROM, the detection is the differential phase detection.

Figure 2:
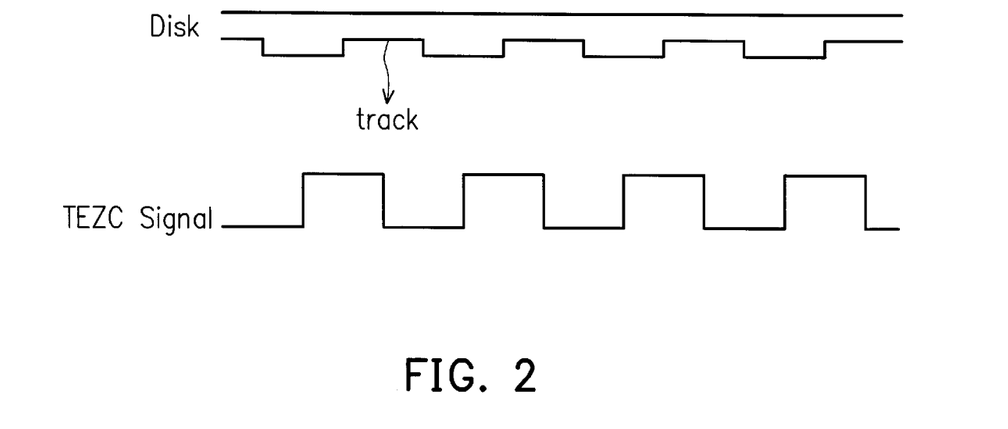
FIG. 2 is a schematic diagram comparing a cross section of an optical storage disk with a TEZC signal.

FIG. 2 is a schematic diagram comparing a cross section of an optical storage disk with a TEZC signal. As shown in FIG. 2, as soon as the pickup head crosses a track, a square pulse wave is generated and recorded in the TEZC signal series. The number of tracks that the pickup head has crossed is obtained by computing the number of the pulse waves.

Figure 3:
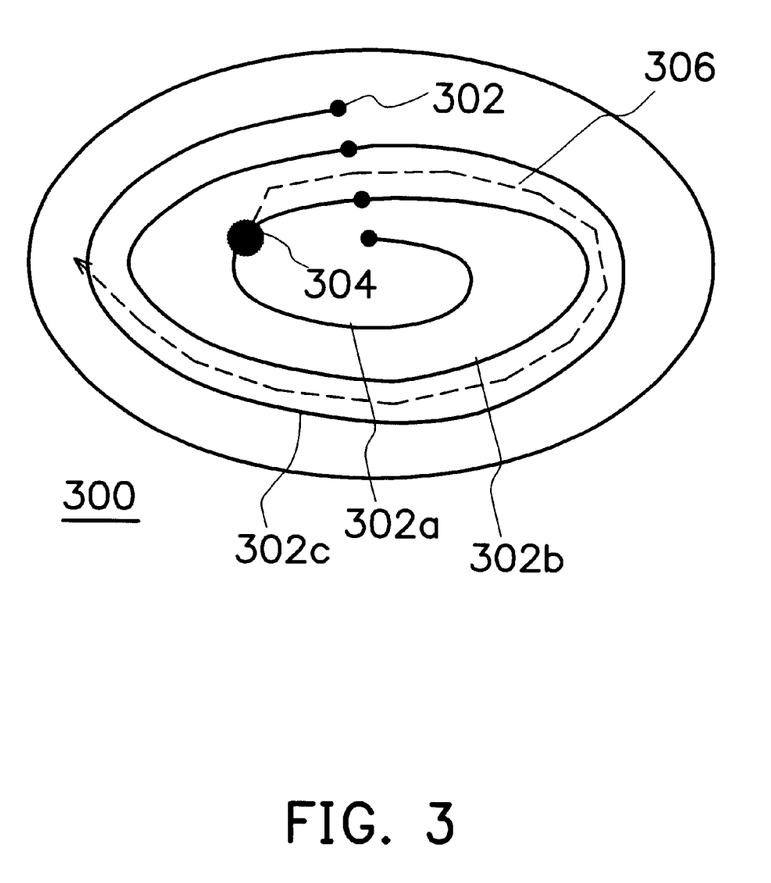
FIG. 3 is a schematic diagram of a moving track of a pickup head in an optical storage disk when the disk is rotating.

FIG. 3 is a schematic diagram of a moving track of the pickup head in the optical storage disk when the disk is rotating. As shown in FIG. 3, the track 302 in the disk 300 is presented as a spiral line while the moving track 306 of the pickup head 304 is presented as a dash line. Since there is a relative rotating speed between the pickup head 304 and the disk 300, the moving track 306 also has a spiral shape.

In FIG. 3 it is assumed that the pickup head 304 is initially located at the kth track 302a, and the target track is the k+2th track 302c. According to the prior art, the number of the pulse wave recorded in the TEZC signal series is 2; then, the pickup head 304 moves to the target track. However, due to the relative rotating speed between the pickup head 304 and the disk 300, the pickup head 304 does not cross the k+1th track 302b, but directly jumps to the k+2th track 302c from the kth track 302a. Thus, the TEZC signal series only records 1 pulse wave. That is, when the pickup head 304 moves from the kth track 302a to the k+2th track 302c, the pickup head 304 only crosses 1 track in accordance with the TEZC signal series; however, in fact, the pickup head 304 crosses 2 tracks.

Thus, in the seeking operation, the relative motion between the pickup head and the disk can cause an error in computing the track seeking number. The invention provides a track-number seeking algorithm and a seeking means for the dynamic modification of the computation of track numbers in an optical storage device. The theory of the track-number seeking algorithm and the hardware and the firmware of the seeking means are described as follows.

1. Theory of Computation

Figure 4:
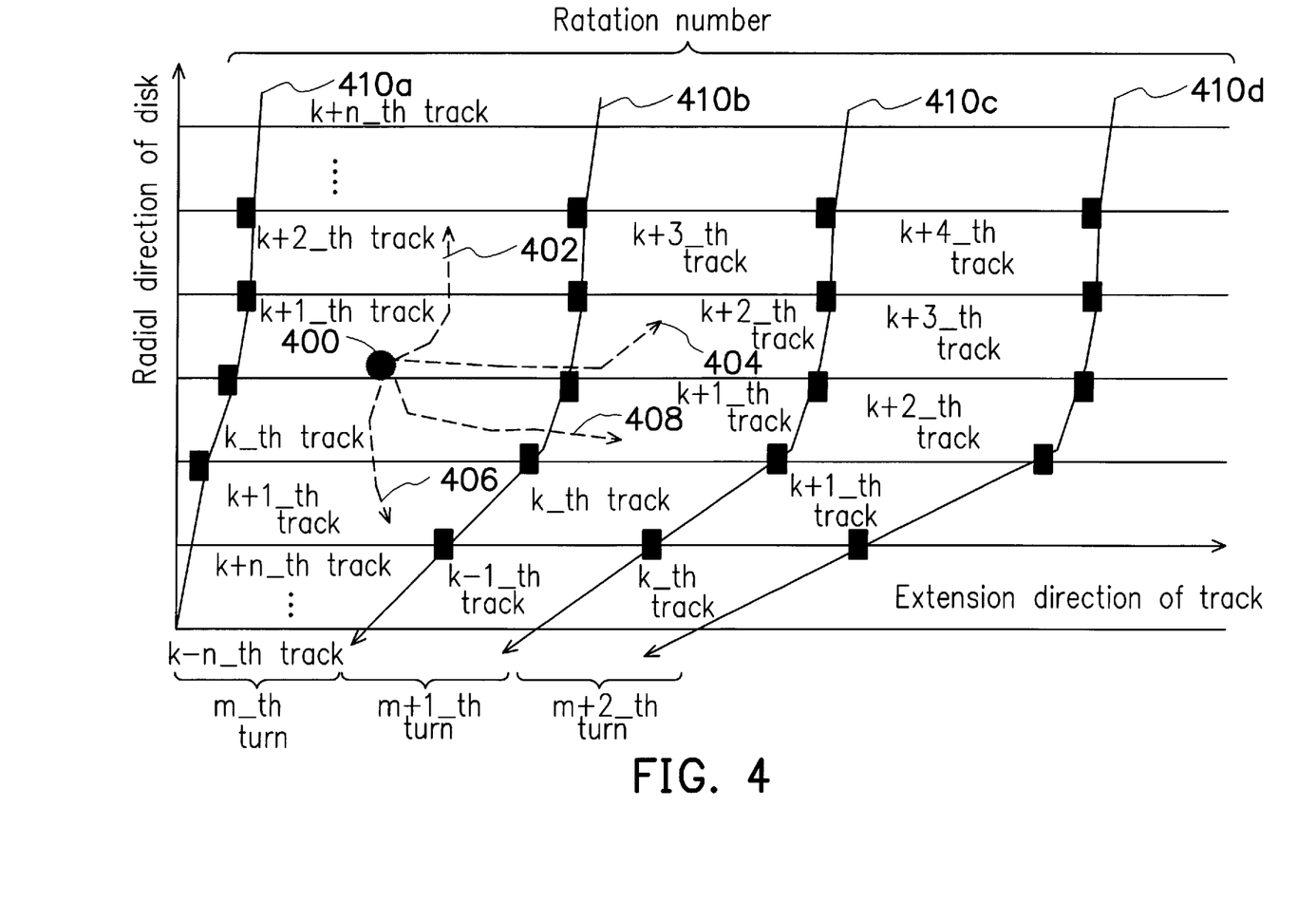
FIG. 4 is a schematic diagram of the relationship between the distribution of tracks in an optical storage disk and the rotation number.

FIG. 4 is a schematic diagram of the relationship between the distribution of tracks in an optical storage disk and the rotation number. In FIG. 4, the spiral tracks are cut and extended. The horizontal axis represents the extension direction, i.e. the length direction of the tracks while the vertical axis represents the radial direction of the disk. Lines 410a, 410b, 410c, and 410d represent boundaries among rotation numbers. Dashed lines 402, 404, 406, and 408 represent the moving tracks of the pickup head 400. The region between the boundary 410a and the boundary 410b presents the tracks arranged along the radial direction at the mth rotation number, the region between the boundary 410b and the boundary 410c presents the tracks arranged along the radial direction at the m+1th rotation number, the region between the boundary 410c and the boundary 410d presents the tracks arranged along the radial direction at the m+2th rotation number, and so on.

When outwardly seeking, as shown in FIG. 4, the pickup head 400 is located at the kth track at the mth rotation number and the target track is the k+nth track; thus, the relative track seeking number is n. If the pickup head 400 moves to the k+nth target track before completing the mth rotation number, i.e. the pickup head 400 moves along the moving track 402, and the number of the pulse wave in the TEZC signal series is n, the pickup head 400 arrives at the k+nth target track.

However, if there is a greater relative rotating speed between the pickup head 400 and the disk, the pickup head 400 is forced to move into the m+1th rotation number. That is, when the pickup head 400 moves along the moving track 404, the pickup head 400 directly moves from the kth track at the mth rotation number to the k+2th track at the m+1th rotation number while the pickup head 400 has not crossed the k+1th track. Thus, the relative track seeking number at the m+1th rotation must be modified and the number is n+1 as a reference for the TEZC signal series. The principle for computing is as follows.

(Principle 1)

When a pickup head performs an outwardly seeking operation in an optical storage disk and the pickup head has not moved to the target track; as soon as 1 revolution is added to the rotation number of the disk, 1 track is correspondingly subtracted from the relative track seeking number.

In addition, in the case of inwardly seeking, as shown in FIG. 4, the pickup head 400 is located at the kth track at the mth rotation number, and the target track is the k-nth track; thus, the relative track seeking number is n. If the pickup head 400 moves to the k-nth target track before completing the mth rotation number, i.e., the pickup head 400 moves along the moving track 406, and the number of the pulse wave in the TEZC signal series is n, the pickup head 400 arrives at the k-nth target track.

However, if there is a greater relative rotating speed between the pickup head 400 and the disk, the pickup head 400 is forced to move into the m+1th rotation number. That is, when the pickup head 400 moves along the moving track 408, the pickup head 400 directly moves from the kth track at the mth rotation number to the kth track at the m+1th rotation number while the pickup head 400 has not crossed the k−1th track. Thus, the relative track seeking number at the m+1th rotation must be modified and the number is n+1 as a reference for the TEZC signal series. The principle for computing is as follows.

(Principle 2)

When a pickup head performs an inwardly seeking operation in an optical storage disk and the pickup head has not moved to the target track, as soon as 1 revolution is added to the rotation number of the disk, 1 track is correspondingly added to the relative track seeking number.

2. Hardware and Firmware of the Seeking Means

Figure 5:
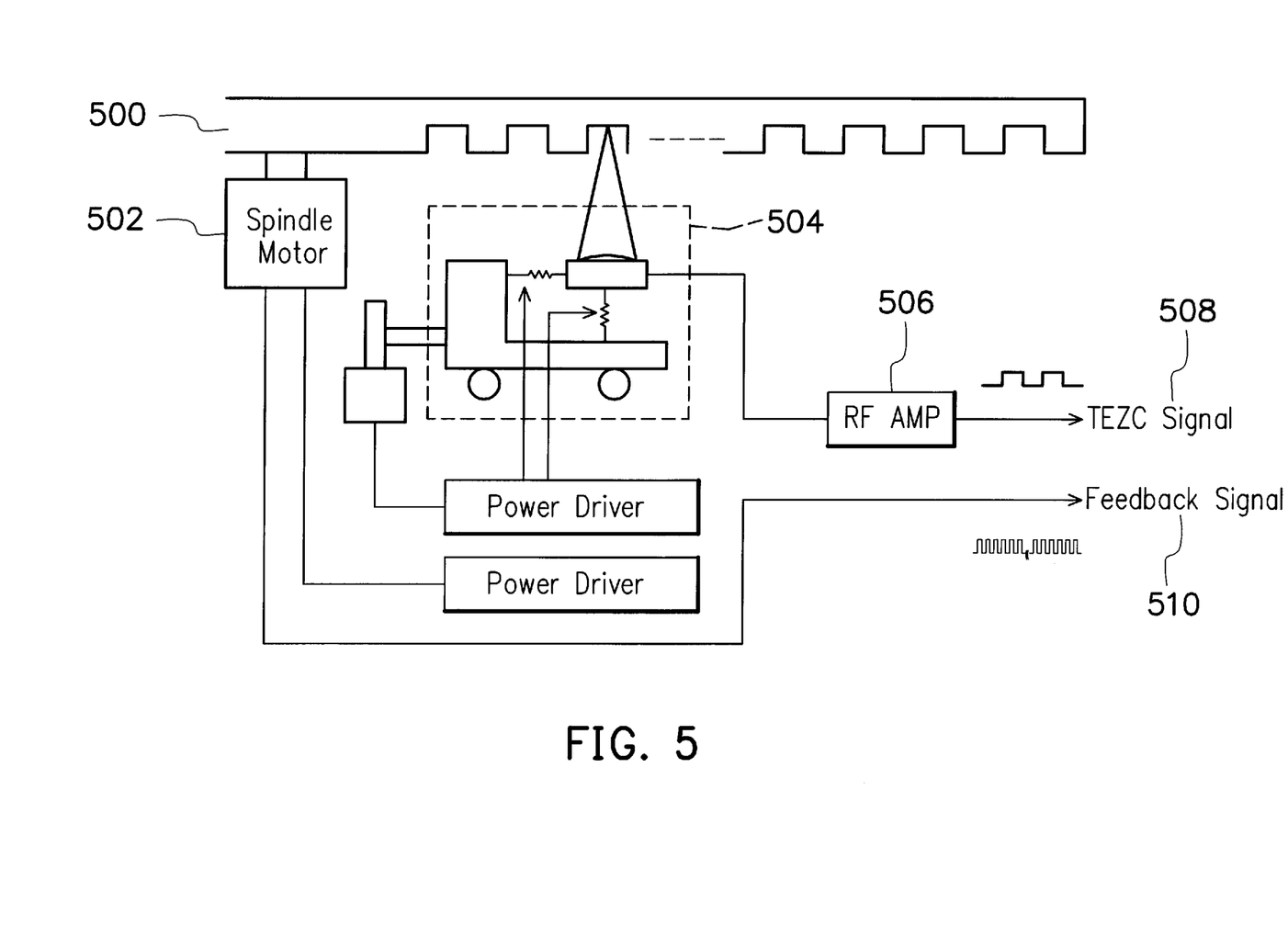
FIG. 5 is a schematic diagram of the seeking servo system of an optical storage device.

FIG. 5 is a schematic diagram of the seeking servo system of an optical storage device. As shown in FIG. 5, a spindle motor 502 is used to rotate the optical storage disk 500, and a pickup head 504 is used to write data onto the disk 500 and/or read data from the disk 500. The spindle motor 502 and the pickup head 504 are driven by power drivers. After the signal obtained from the pickup head 504 is treated by a pre-amplifier 506, a TEZC signal 508 is generated. The TEZC signal 508, a feedback signal 510 obtained from the spindle motor 502, and the above two principles for computing the combination are used to perform the seeking operation to dynamically modify the relative track seeking number between the starting track the pickup head 504 locates and the target track.

Figure 6:
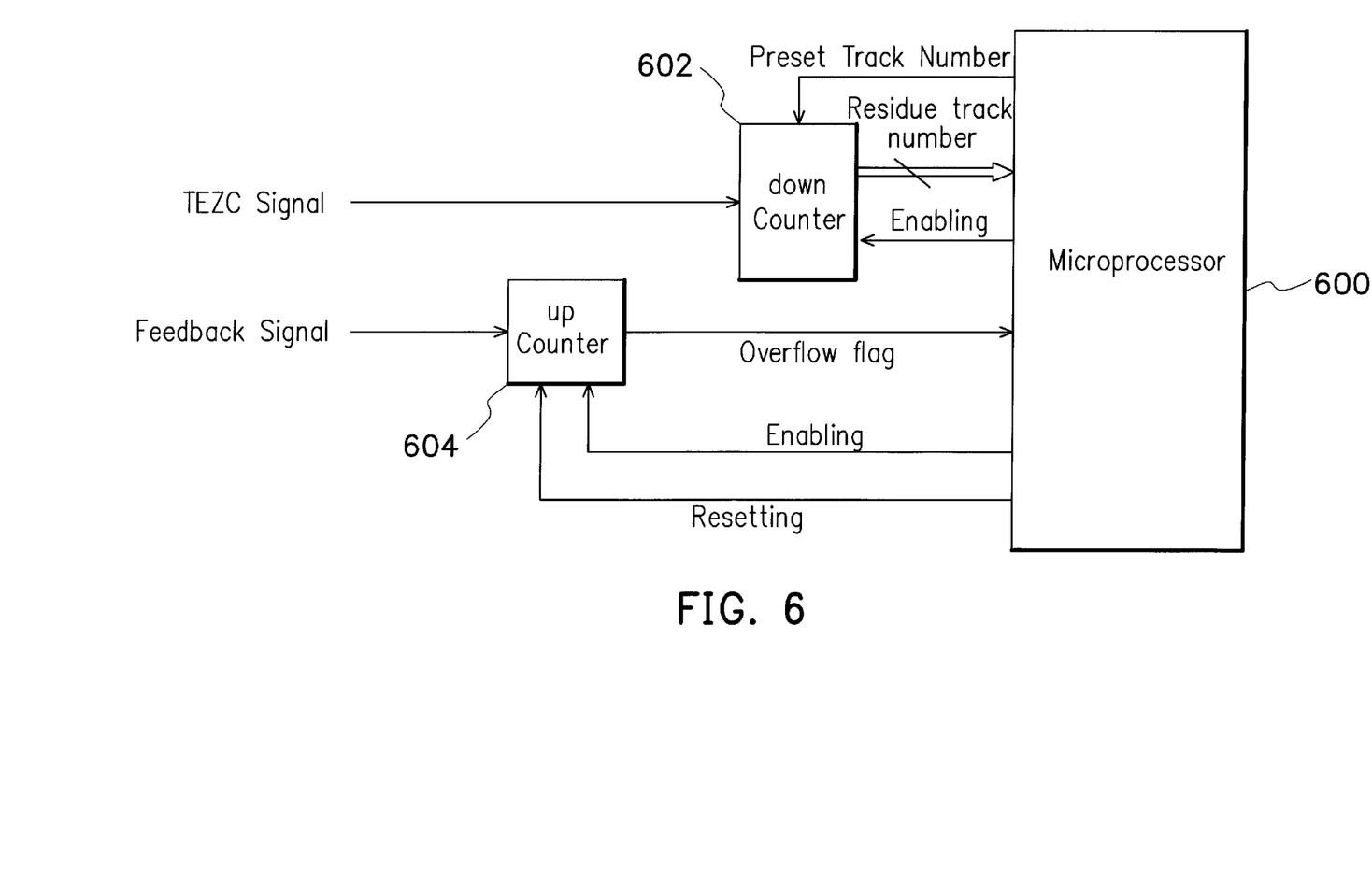
FIG. 6 is a schematic diagram of a seeking means for the dynamic modification of the computation of track numbers in an optical storage device according to a preferred embodiment of the invention.

FIG. 6 is a schematic diagram of a seeking means for the dynamic modification of the computation of track numbers in an optical storage device according to a preferred embodiment of the invention. The seeking means comprises a down counter 602, an up counter 604, a microprocessor 600, etc.

As shown in FIG. 6, the down counter 602 is coupled with a pickup head such as the 504 in FIG. 4 and the microprocessor 600 for receiving the static relative track seeking number and the enabling signal provided by the microprocessor 600 and the TEZC signal obtained from the pickup head in order to compute a residual track number and to input the residual track number to the microprocessor 600. The up counter 604 is coupled with a spindle motor such as the 502 in FIG. 4 and the microprocessor 600 for receiving the feedback signal obtained from the spindle motor in order to compute a rotation number of the disk and to input an overflow flag of the counter 604 to the microprocessor 600. The microprocessor 600 is coupled with the down counter 602 and the up counter 604. The microprocessor 600 uses the enabling signal to control the down counter 602 and the up counter 604, and uses a resetting signal to set the up counter 604 and to reset the number of the pulse wave in the TEZC signal to zero. The functions of the microprocessor 600 comprise computing the static relative track seeking number, comparing the overflow flag of the up counter 604 with the residual track number output from the down counter 602, judging whether the pickup head removes to the target track or not, controlling the power driver to move the pickup head, etc.

Figure 7:
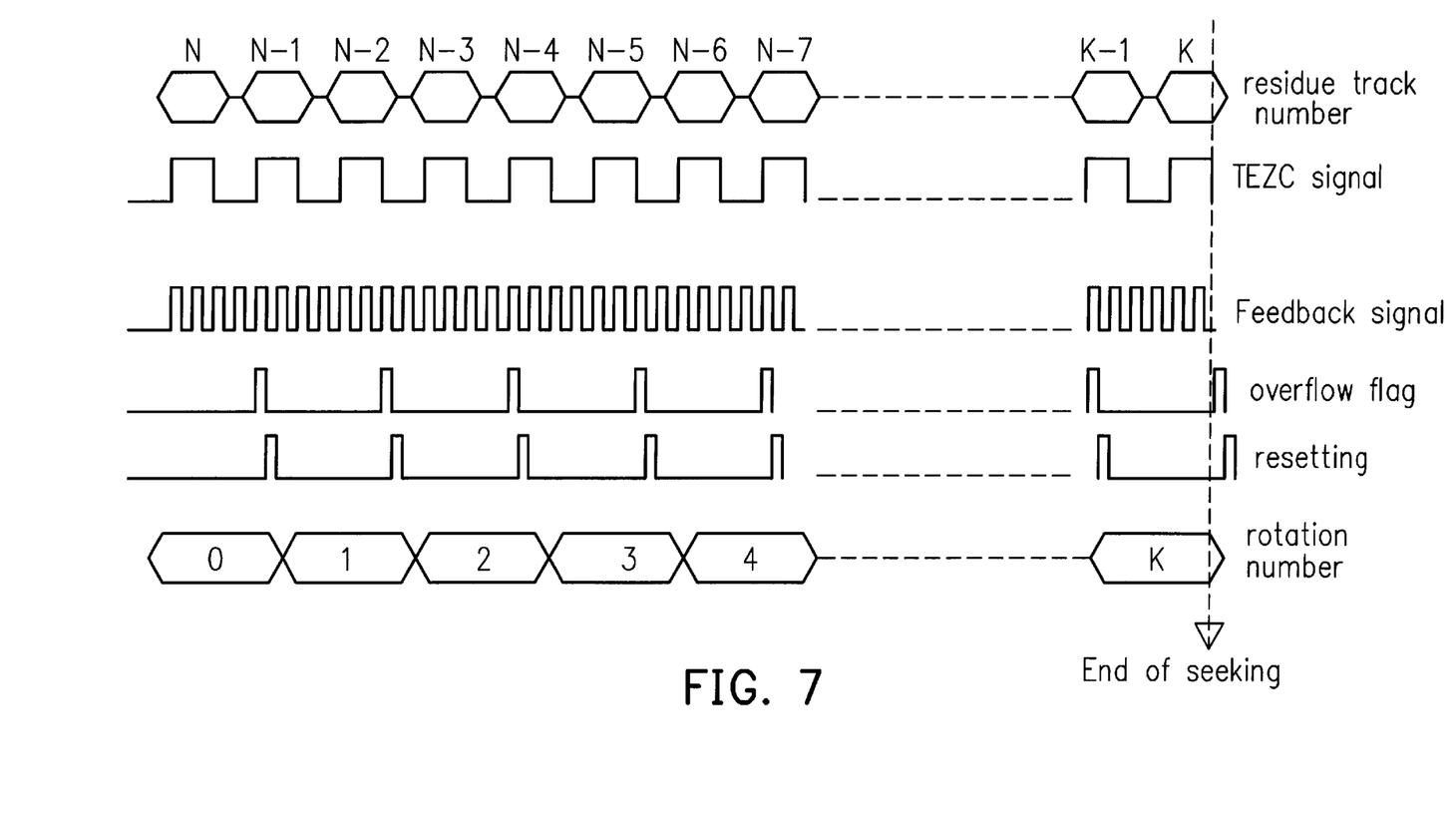
FIG. 7 is a timing chart showing a seeking means performing a seeking operation for the dynamic modification of the computation of track numbers in an optical storage device according to a preferred embodiment of the invention.
Figure 8:
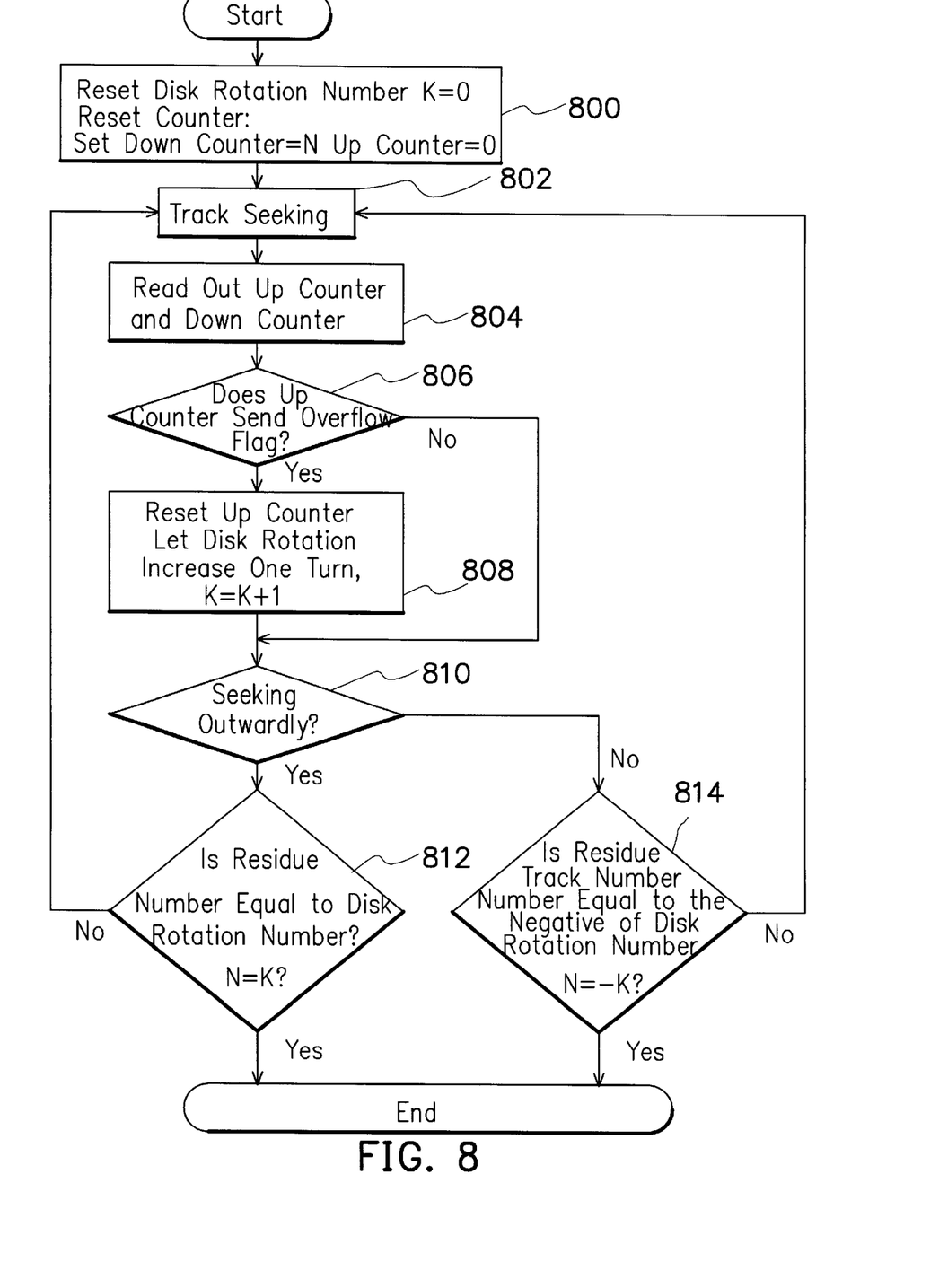
FIG. 8 is a flow chart of a process of a seeking means performing a seeking operation for the dynamic modification of the computation of track numbers in an optical storage device according to a preferred embodiment of the invention.

FIG. 7 is a timing chart showing a seeking means performing a seeking operation for the dynamic modification of the computation of track numbers in an optical storage device according to a preferred embodiment of the invention. The timing chart comprises a TEZC signal, a feedback signal of a spindle motor, an overflow flag of a counter, a resetting signal, a rotation number of a disk and a residual track number. FIG. 8 is a flow chart of a process of a seeking means performing a seeking operation for the dynamic modification of the computation of track numbers in an optical storage device according to a preferred embodiment of the invention.

In FIG. 7, the TEZC signal provided by the pickup head and received by the down counter and the static relative track seeking number set by the microprocessor of combination are used to compute the residual track number. As soon as the spindle motor rotates 1 revolution, the feedback signal of the spindle motor generates 6 square wave pulses. According to the pulses, the up counter generates a corresponding overflow flag. That is, 6 pulses correspond to 1 overflow flag. After the microprocessor receives the overflow flag input from the up counter, the microprocessor outputs the resetting signal to the up counter, and the pulse number of the feedback signal is reset to zero in order to re-count the pulse number of the feedback signal and to compute the rotation number in accordance with that. According to the rotation number of the disk, the residual track number and the above principle for computing of combination, the microprocessor performs the seeking operation and dynamically modifies the relative track seeking number between the track the pickup head locates and the target track.

Referring to FIG. 8 and using FIG. 7 and 6 as references, the track-number seeking algorithm of the invention is described as follows.

In step 800, the rotation number K stored in a microprocessor (such as microprocessor 600 in FIG. 6) is reset to zero (i.e. K=0), and the microprocessor resets the static relative track seeking number in the down counter (such as down counter 602 in FIG. 6) to K and resets the up counter (such as up counter 604 in FIG. 6) to zero.

In step 802, a seeking operation is performed. In step 804, using FIG. 7 as a reference, the residual track number N is obtained by means of the static relative track seeking number that the down counter obtains from the pickup head and the static relative track seeking number of combination, and the up counter receives the feedback signal from the spindle motor. As soon as the down counter receives a TEZC signal, the relative track seeking number is modified, and the residual track number obtained from the modification is input to the microprocessor. In step 806, the up counter decides according to the received feedback signal whether the overflow flag should be sent. When the pulse number received from the spindle motor is 6, the up counter outputs an overflow flag to the microprocessor.

If the up counter outputs the overflow flag, the process goes to step 808. When the microprocessor receives the overflow flag from the up counter, according to the overflow flag, 1 revolution is added to the rotation number of the disk, and the resetting signal is sent to the up counter to reset the pulse number of the feedback signal to zero. Then, the process goes to step 810 to judge the seeking direction. In the judgement of step 810, if the seeking operation is outwardly seeking, the process then goes to step 812. In step 812, the microprocessor judges whether the residual track number in the down counter is equal to the rotation number of the disk or not. If positive, the pickup head is at the target track and the seeking operation is terminated. If negative, the process goes to step 802 and the seeking operation is repeated.

Referring, to step 810, if the seeking operation is not outwardly seeking, it is inwardly seeking. The process then goes to step 814. In step 814, the microprocessor judges whether the residual track number in the down counter is equal to the negative value of the rotation number of the disk or not. If positive, the pickup head is at the target track and the seeking operation is terminated. If negative, the process goes to step 802 and the seeking operation is repeated.

The prior art and the invention are tested in the seeking operation using the same optical storage driver and the same servo controlling parameters. The testing results are given as follows.

(1) Comparison in the Number of Track Jumping

The average number of track jumping is 4.62 according to the prior art and is 3.89 according to the invention.

(2) Testing in Winbench 98

When the seeking operation is repeated 10 times, out of 1000 seeking operations, the average access time is 101.2 ms is the prior art. When the seeking operation is repeated 10 times, out of 1000 seeking operations, the average access time is 93 ms in the invention.

Referring to Table 1, a summary of the testing results, in comparison with the prior art, the average number of track jumping in the invention decreases by 0.73 times and the average access time in the invention decreases by 8.2 ms.

TABLE 1

|  | Testing in The Prior Art | Testing in The Invention | Improvement |
| --- | --- | --- | --- |
| Average Number of Track Jumping | 4.62 times | 3.89 times | decreased 0.73 times |
| Average Access Time | 101.2 ms | 93 ms | decreased 8.2 ms |

According to the preferred embodiment of the invention, the track-number seeking algorithm and the seeking means for the dynamic modification of the computation of track numbers in an optical storage device can efficiently reduce the deviation that results from the relative motion between the pickup head and the disk, decrease the frequency of track jumping, shorten the average access time and further enhance the performance of the optical storage device.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A track-number seeking algorithm for the dynamic modification of the computation of track numbers in an optical storage device, the algorithm comprising:

resetting a rotation number of a disk, a track error zero crossing signal and a pulse number of a feedback signal, and setting a static track seeking number;

performing a seeking operation;

reading the pulse number of a feedback signal and the track error zero crossing signal;

judging whether an overflow flag is to be sent in accordance with the pulse number of the feedback signal;

performing an outwardly seeking operation if the overflow flag is not sent;

resetting the pulse number of the feedback signal, increasing the rotation number of the disk by one revolution, and judging whether the seeking is outward or not if the overflow flag is sent;

terminating the seeking operation if the seeking is outward and the residual track number is equal to the rotation number of the disk;

repeating the seeking operation if the seeking is outward, but the residual track number is not equal to the rotation number of the disk;

terminating the seeking operation if the seeking is inward and the residual track number is equal to a negative value of the rotation number of the disk; and repeating the seeking operation if the seeking is inward, but the residual track number is not equal to the negative value of the rotation number of the disk.

2. A principle for a track-number seeking algorithm in an outwardly seeking operation for the dynamic modification of the computation of track numbers in an optical storage device: When a pickup head performs the outwardly seeking operation in an optical storage disk and the pickup head has not moved to an target track, as soon as 1 revolution is added to a rotation number of the disk, 1 track is correspondingly subtracted from a relative track seeking number, and a comparison between a track error zero crossing signal and a residual track number obtained from a static track seeking number and the rotation number decides whether the pickup head is at the target track or not.

3. A principle for a track-number seeking algorithm in an inwardly seeking operation for the dynamic modification of the computation of track numbers in an optical storage device: When a pickup head performs the inwardly seeking operation in an optical storage disk and the pickup head has not moved to a target track, as soon as 1 revolution is added to a rotation number of the disk, 1 track is correspondingly added to a relative track seeking number, and a comparison between a track error zero crossing signal and a residual track number obtained from a static track seeking number and the rotation number decides whether the pickup head is at the target track or not.

4. A principle for a track-number seeking algorithm for the dynamic modification of the computation of track numbers in an optical storage device: When a pickup head performs an outwardly seeking operation in an optical storage disk and the pickup head has not moved to a target track, as soon as 1 revolution is added to a rotation number of the disk, 1 track is correspondingly subtracted from a relative track seeking number, and a comparison between a track error zero crossing signal and a residual track number obtained from a static track seeking number and the rotation number decides whether the pickup head is at the target track or not.

5. The principle of the track-number seeking algorithm of claim 4, wherein when a pickup head performs the inwardly seeking operation in an optical storage disk and the pickup head has not moved to a target track, as soon as 1 revolution is added to a rotation number of the disk, 1 track is correspondingly added to a relative track seeking number, and a comparison between a track error zero crossing signal and a residual track number obtained from a static track seeking number and the rotation number decides whether the pickup head is at the target track or not.

6. A track-number seeking means of an optical storage device, including a spindle motor used to rotate an optical storage disk and a pickup head used to access data on the disk, and comprising:

- an up counter, wherein the up counter is coupled with the spindle motor to receive a feedback signal from the spindle motor, and, according to the feedback signal, as soon as the disk rotates 1 revolution, an overflow flag is output;
- a down counter, wherein the down counter is coupled with the pickup head to receive a track error zero crossing signal; and
- a microprocessor, wherein the microprocessor is coupled with the up counter and the down counter, and the microprocessor can reset and enable the up counter and the down counter, input a static track seeking number to the down counter, receive a residual track number from the down counter, receive an overflow flag to compute a rotation number of the disk, and compare the residual track number with the rotation number to judge whether a track-number seeking operation is to be repeated.

* * * * *